Figure 1:
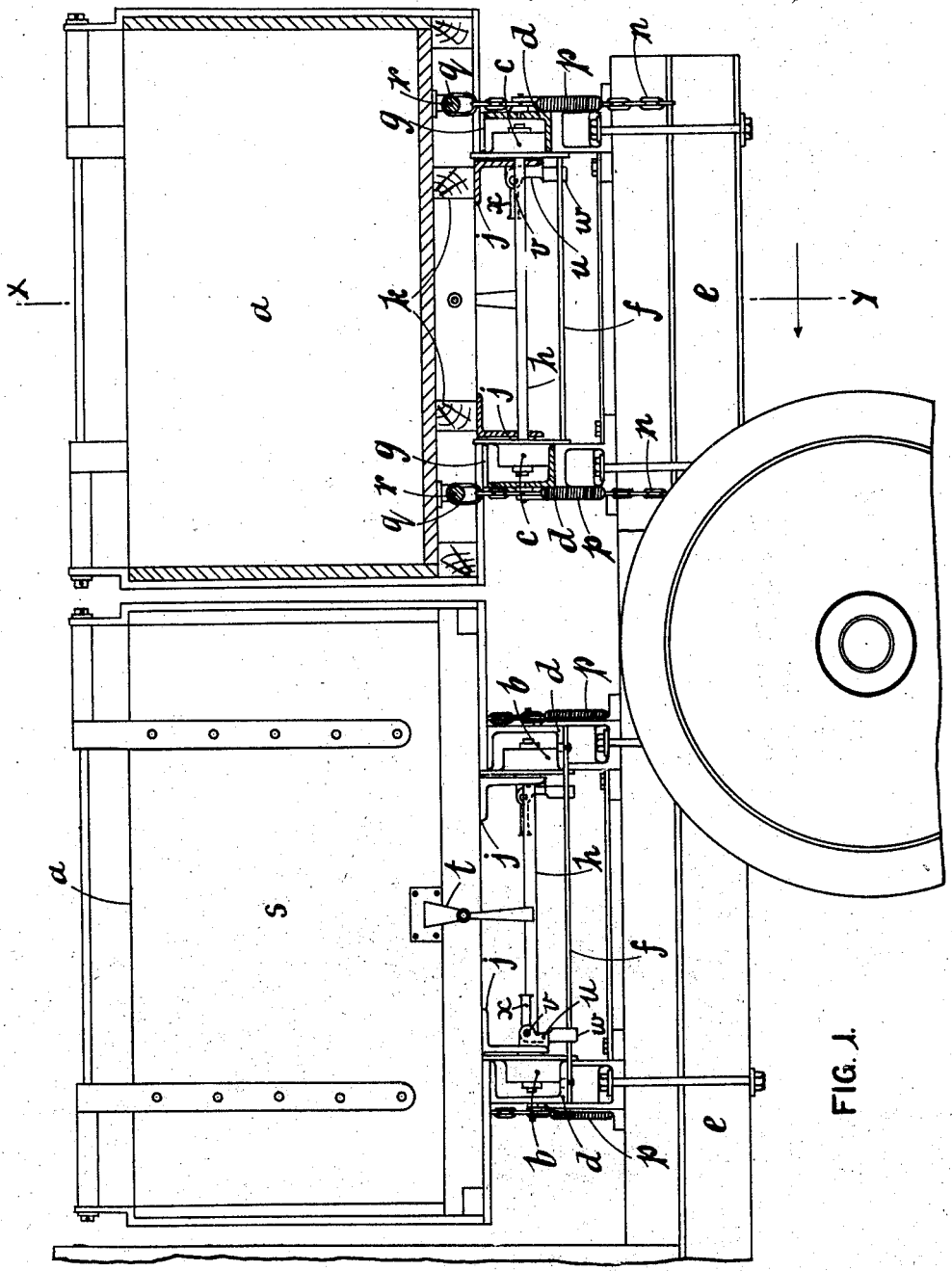

April 14, 1925. 1,533,453
W. L. PAYNTER
SIDE TIPPING BODY FOR VEHICLES
Filed Dec. 5, 1924 2 Sheets-Sheet 1

INVENTOR
WILLIAM LIVINGSTONE PAYNTER
By Toulmin & Toulmin
ATTORNEYS

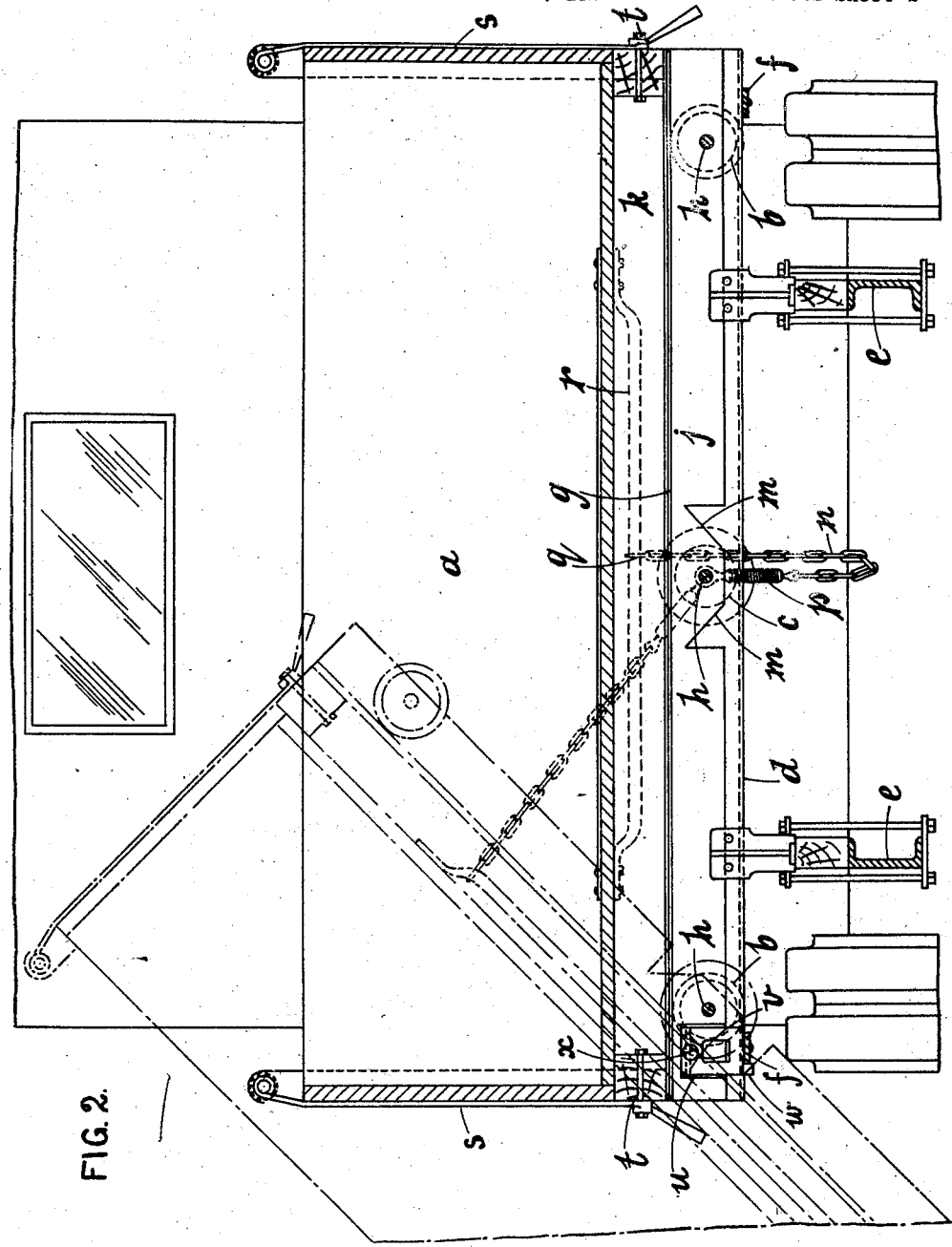

Patented Apr. 14, 1925.

1,533,453

UNITED STATES PATENT OFFICE.

WILLIAM L. PAYNTER, OF NEWCASTLE-UPON-TYNE, ENGLAND.

SIDE-TIPPING BODY FOR VEHICLES.

Application filed December 5, 1924. Serial No. 754,171.

*To all whom it may concern:*

Be it known that I, WILLIAM LIVINGSTONE PAYNTER, a subject of the King of Great Britain and Ireland, residing at Newcastle-upon-Tyne, England, have invented certain new and useful Improvements in Side-Tipping Bodies for Vehicles, of which the following is a specification, reference being had therein to the accompanying drawing.

This invention relates to side-tipping bodies for road and rail vehicles, and has for its object to provide an improved construction capable of being fitted as a unit to the chassis or frames of many types of road and rail vehicles.

A side-tipping body in accordance with my invention is mounted on three pairs of rollers, the flanges of the central pair being of larger diameter than those of the two outer pairs, said rollers running between the flanges of a pair of transverse channel bars on the vehicle chassis, the central rollers coacting with stop bars at the ends of the channel bars which prevent them overrunning the channel bars and the outer rollers coacting with apertures in the centres of the top flanges of the channel bars which allow them to rise out of the channel bars when the body tips. The spindles of the rollers are carried by transverse angle bars notched on each side of the central spindle and adapted to coact with the stop bars to prevent the body recoiling during the tipping movement. A pair of check chains or like flexible connections are provided, one end of each connection being fixed to the centre of the adjacent channel bar and the other end having a ring embracing and free to travel on a transverse rod on the underside of the body.

The accompanying drawings illustrate the rear portion of a motor road vehicle on which is mounted a pair of side-tipping bodies in accordance with my invention. In the drawings, Figure 1 is a side elevation, partly in section, and Figure 2 is a transverse section on the line X—Y in Fig. 1.

Referring to the drawings, in the example therein illustrated, each side-tipping body $a$ is mounted on three pairs of rollers $b$, $c$, $b$, the central rollers $c$ having flanges of larger diameter than those of the rollers $b$. The rollers run between the flanges of a pair of transversely disposed channel bars $d$ carried by the vehicle chassis $e$. At each end of the pair of channel bars $d$ is a bar $f$ which ties them together and forms a stop coacting with the flanges of the central pair of rollers $c$. In the central portions of the upper flanges of the channel bars $d$ apertures $g$ are provided, and, when the body $a$ is pushed across the vehicle from one side or the other, it automatically tips by gravity when the flanges of the central pair of rollers $c$ strike the stop bar $f$ which prevents them overrunning the ends of the channel bars $d$, the following rollers $b$ rising out of the channel bars through the apertures $g$ in the upper flanges thereof, as shown in dot-and-dash lines in Fig. 2.

The spindle $h$ of each pair of rollers lies lengthwise of the vehicle and is carried by transverse angle bars $j$ bolted directly to the under frame $k$ of the body $a$, and the rollers may, if desired, run on ball bearings. On each side of the central roller spindle the angle bars $j$ are notched as shown at $m$, said notches being disposed so that, when the body tips, the pair of notches on that side of the roller $c$ towards which the body tips engages the stop bar $f$ and prevents the body recoiling during the tipping movement and damaging its underside.

Check chains $n$ and springs $p$ are provided at the front and rear of the body $a$, one end of each connection being fixed to the centre of the adjacent channel bars $d$ and the other end of the connection being provided with a ring $q$ embracing and free to travel on a transverse rod $r$ attached to the underside of the body $a$. This arrangement allows of a single pair of connections being employed which check the body when tipping to either side and retain it at the required angle of tip.

The sides $s$ of the body $a$ are hinged along their upper edges so as to swing outwards when the body tips. Pivoted latches $t$ are provided at each side for fastening said swinging sides.

The body $a$ is locked in the normal upright central position by catches $u$ pivoted at $v$ to the angle bars $j$ at each side engaging on the outsides of the stop bars $f$ and preventing transverse movement of the body until one or the other of the catches is swung up on its pivot out of the way by means of the handles $x$.

The tipping body may be made of any desired size and capacity, and one, two or more bodies may be mounted on the chassis of a single vehicle.

Tipping bodies according to my invention are particularly applicable to motor lorries and the like road vehicles for the delivery of household coal, coke and the like.

What I claim and desire to secure by Letters Patent is:—

1. For a road or rail vehicle, a side-tipping body, three pairs of flanged rollers on the underside thereof with their spindles transversely of the body, the flanges of the central pair of rollers being of larger diameter than the flanges of the two outer pairs of rollers, a pair of transverse channel bars on the vehicle chassis between which said rollers run, stop bars at the ends of said channel bars with which said central rollers coact and which prevent the central rollers overrunning the channel bars, and apertures in the centres of the top flanges of the channel bars which allow the outer rollers to rise out of the channel bars when the body tips.

2. For a road or rail vehicle, a side-tipping body, three pairs of flanged rollers on the underside thereof with their spindles transversely of the body, the flanges of the central pair of rollers being of larger diameter than the flanges of the two outer pairs of rollers, a pair of transverse channel bars on the vehicle chassis between which said rollers run, stop bars at the ends of said channel bars with which said central rollers coact and which prevent the central rollers overrunning the channel bars, apertures in the centres of the top flanges of the channel bars which allow the outer rollers to rise out of the channel bars when the body tips, and transverse angle bars carrying the spindles of said rollers, said angle bars being notched on each side of the central spindle and adapted to coact with said stop bars to prevent the body recoiling during the tipping movement.

3. For a road or rail vehicle, a side-tipping body, three pairs of flanged rollers on the underside thereof with their spindles transversely of the body, the flanges of the central pair of the rollers being of larger diameter than the flanges of the two outer pairs of rollers, a pair of transverse channel bars on the vehicle chassis between which said rollers run, stop bars at the ends of said channel bars with which said central rollers coact and which prevent the central rollers overrunning the channel bars, and apertures in the centres of the top flanges of the channel bars which allow the outer rollers to rise out of the channel bars when the body tips, transverse angle bars carrying the spindles of said rollers, said angle bars being notched on each side of the central spindle and adapted to coact with said stop bars to prevent the body recoiling during the tipping movement, a transverse rod on the underside of the body, and a flexible connection, one end of the connection being fixed to the centre of the adjacent channel bar and the other end engaging and free to travel on said transverse rod.

In testimony whereof I affix my signature.

WILLIAM L. PAYNTER.